(12) United States Patent
Chen et al.

(10) Patent No.: US 12,285,870 B2
(45) Date of Patent: Apr. 29, 2025

(54) ROBOT CONTROL METHOD, ROBOT AND COMPUTER-READABLE STORAGE MEDIUM

(71) Applicant: UBTECH ROBOTICS CORP LTD, Shenzhen (CN)

(72) Inventors: Chunyu Chen, Shenzhen (CN); Ligang Ge, Shenzhen (CN); Yizhang Liu, Shenzhen (CN); Jiangchen Zhou, Shenzhen (CN); Qiuyue Luo, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 390 days.

(21) Appl. No.: 18/070,313

(22) Filed: Nov. 28, 2022

(65) Prior Publication Data
US 2023/0182297 A1    Jun. 15, 2023

(51) Int. Cl.
*B25J 9/16*      (2006.01)
*B25J 13/08*     (2006.01)
*B62D 57/032*    (2006.01)

(52) U.S. Cl.
CPC ........... *B25J 9/1664* (2013.01); *B25J 9/1607* (2013.01); *B25J 9/1638* (2013.01); *B25J 9/1651* (2013.01); *B25J 13/088* (2013.01); *B62D 57/032* (2013.01)

(58) Field of Classification Search
CPC ...... B25J 9/1664; B25J 9/1607; B25J 9/1638; B25J 9/1651; B25J 13/088; B62D 57/032; G05B 2219/40367
See application file for complete search history.

(56) References Cited

U.S. PATENT DOCUMENTS

| | | | | |
|---|---|---|---|---|
| 2007/0185618 A1* | 8/2007 | Nagasaka | ............ | B62D 57/032 700/245 |
| 2012/0095598 A1* | 4/2012 | Nagasaka | .............. | B25J 9/1607 700/260 |
| 2019/0344445 A1* | 11/2019 | Song | ...................... | B25J 9/1697 |
| 2020/0206942 A1* | 7/2020 | Wang | ..................... | B25J 13/085 |
| 2021/0146538 A1* | 5/2021 | Lin | ........................ | B25J 9/1664 |
| 2021/0387340 A1* | 12/2021 | Ren | ........................ | B25J 9/1664 |
| 2022/0019196 A1* | 1/2022 | Wang | ..................... | B25J 9/1607 |
| 2022/0193899 A1* | 6/2022 | Wang | ..................... | B25J 9/1607 |
| 2022/0362929 A1* | 11/2022 | Guo | ............................ | B25J 9/163 |
| 2022/0379470 A1* | 12/2022 | Xie | ........................ | B25J 9/1653 |
| 2023/0166400 A1* | 6/2023 | Zeng | ..................... | B25J 9/1664 700/254 |
| 2023/0182307 A1* | 6/2023 | Chen | ..................... | B25J 9/1664 700/254 |

(Continued)

*Primary Examiner* — Jason Holloway
*Assistant Examiner* — Madison B Emmett

(57) ABSTRACT

A method of controlling a robot includes: obtaining an inertia matrix and a slack variable of the robot, and determining a momentum equation of the robot according to the inertia matrix and the slack variable; obtaining reference joint angles corresponding to a reference action of the robot; determining an optimization objective function of the momentum equation according to a first preset weight coefficient of the slack variable and a second preset weight coefficient of the reference joint angles; and determining joint angles of the robot according to the optimization objective function, and driving the robot to move according to the joint angles of the robot.

20 Claims, 4 Drawing Sheets

(56) References Cited

U.S. PATENT DOCUMENTS

| | | | |
|---|---|---|---|
| 2023/0191600 A1* | 6/2023 | Han | B25J 9/1664 |
| | | | 700/250 |
| 2023/0266764 A1* | 8/2023 | Zhang | G05D 1/0214 |
| | | | 701/25 |
| 2024/0181633 A1* | 6/2024 | Zeng | B25J 9/1653 |
| 2024/0217108 A1* | 7/2024 | Luo | B25J 9/1692 |

* cited by examiner

ROBOT CONTROL METHOD, ROBOT AND COMPUTER-READABLE STORAGE MEDIUM

CROSS REFERENCE TO RELATED APPLICATIONS

This application claims priority to Chinese Patent Application No. CN 202111510769.4, filed Dec. 10, 2021, which is hereby incorporated by reference herein as if set forth in its entirety.

BACKGROUND

1. Technical Field

The present disclosure generally relates to robots, and particularly to a robot control method, a robot, and a computer-readable storage medium.

2. Description of Related Art

The redundancy of degrees of freedom of a robotic manipulator means that the end of the manipulator can reach the same position through various different manipulator poses. That is, the robotic manipulator has redundant degrees of freedom. Through the redundancy of degrees of freedom, a robot can complete a task in different poses, or find the optimal pose among multiple redundant degrees of freedom to perform the task, so that the robot can better complete the task.

After the task of the robot is determined, the angle of each joint of the robot can be determined by converting the inertial matrix of the robot according to the momentum equation of the robot. However, after a robot operator has set a reference path for the task, the robot cannot effectively adjust according to the set reference path and the robot's own situation, which is not conducive to improving the flexibility of the robot in performing tasks.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
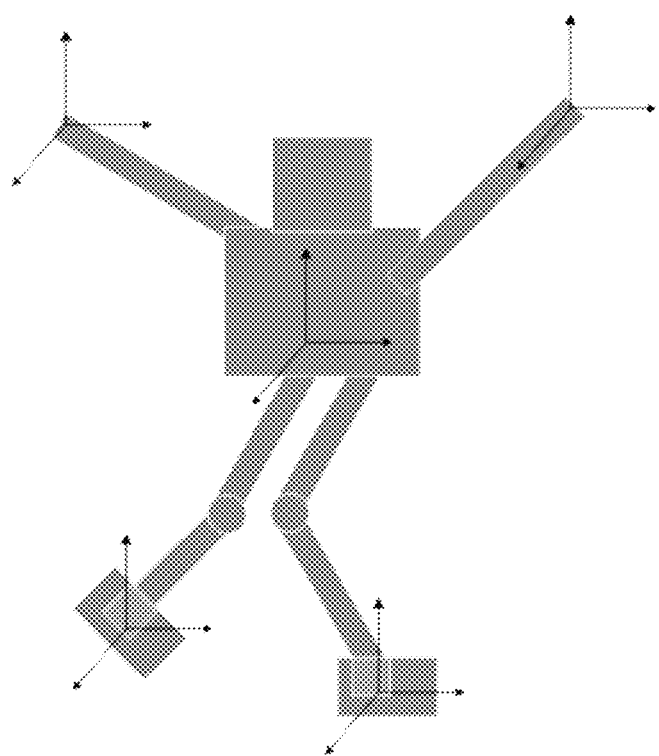
FIG. 1 is a schematic diagram of a biped robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Redundant robot is a robot that has more degrees of freedom than the minimum number of degrees of freedom required to complete a task. In order to complete various tasks, redundant robots are often employed. For example, a 6-DOF robot has complete spatial positioning capability, while more DOF can improve the kinematics and dynamics characteristics of the robots, including increasing flexibility, avoiding obstacles, optimizing driving torques. Therefore, the control of redundant robots becomes increasingly important.

For general robots, they usually have multiple degrees of freedom. For example, the biped robot shown in FIG. 1 has 6 degrees of freedom on one leg and 7 degrees of freedom on one arm. The robot has 26 degrees of freedom in total. When solving joint angles through these 26 degrees of freedom combined with momentum equation, it needs to transform and calculate the inertia matrix composed of 26 joints. The calculated joint angles are not conducive to improving the flexibility of the robot in performing tasks.

Figure 2:
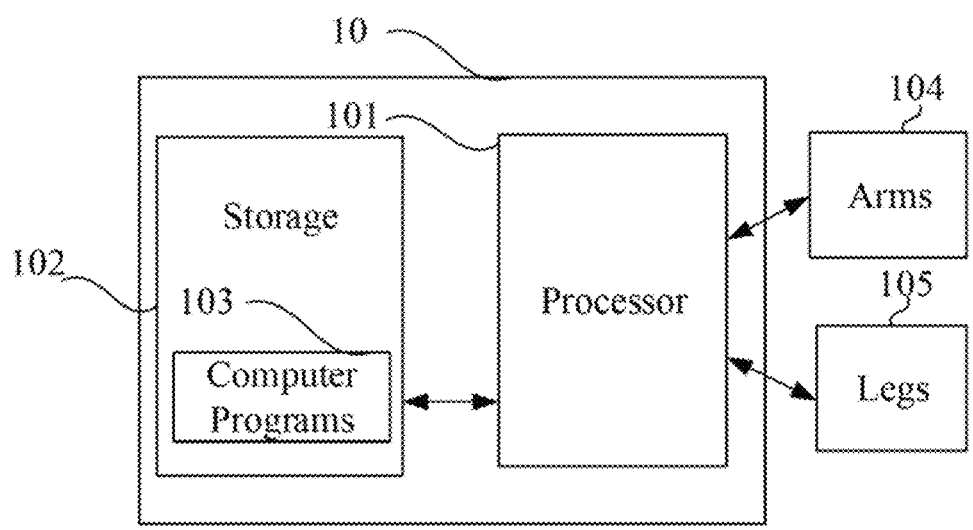
FIG. 2 is a schematic block diagram of a robot according to one embodiment.
Figure 3:
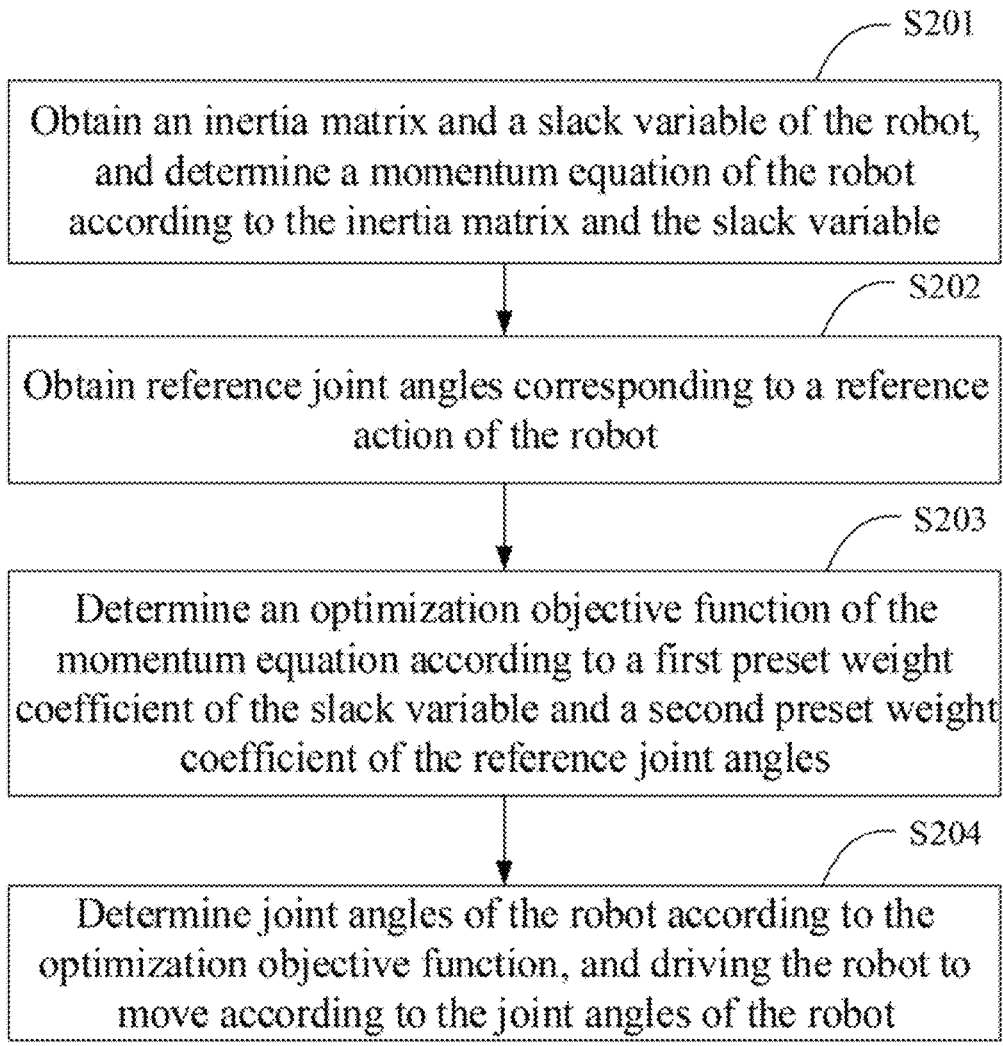
FIG. 3 is an exemplary flowchart of a method for controlling a robot according to one embodiment.

FIG. 2 shows a schematic block diagram of a robot 10 according to one embodiment. The robot 10 may include a processor 101, a storage 102, and one or more executable computer programs 103 that are stored in the storage 102. The storage 102 and the processor 101 are directly or indirectly electrically connected to each other to realize data transmission or interaction. For example, the storage 102 and the processor 101 can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot 10, such as steps S201 to S204 in FIG. 3 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 10, such as a hard disk or a memory. The storage 102 may also be an external storage device of the robot 10, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot 10. The storage 102 can also be used to temporarily store data that have been output or is about to be output.

Figure 4:
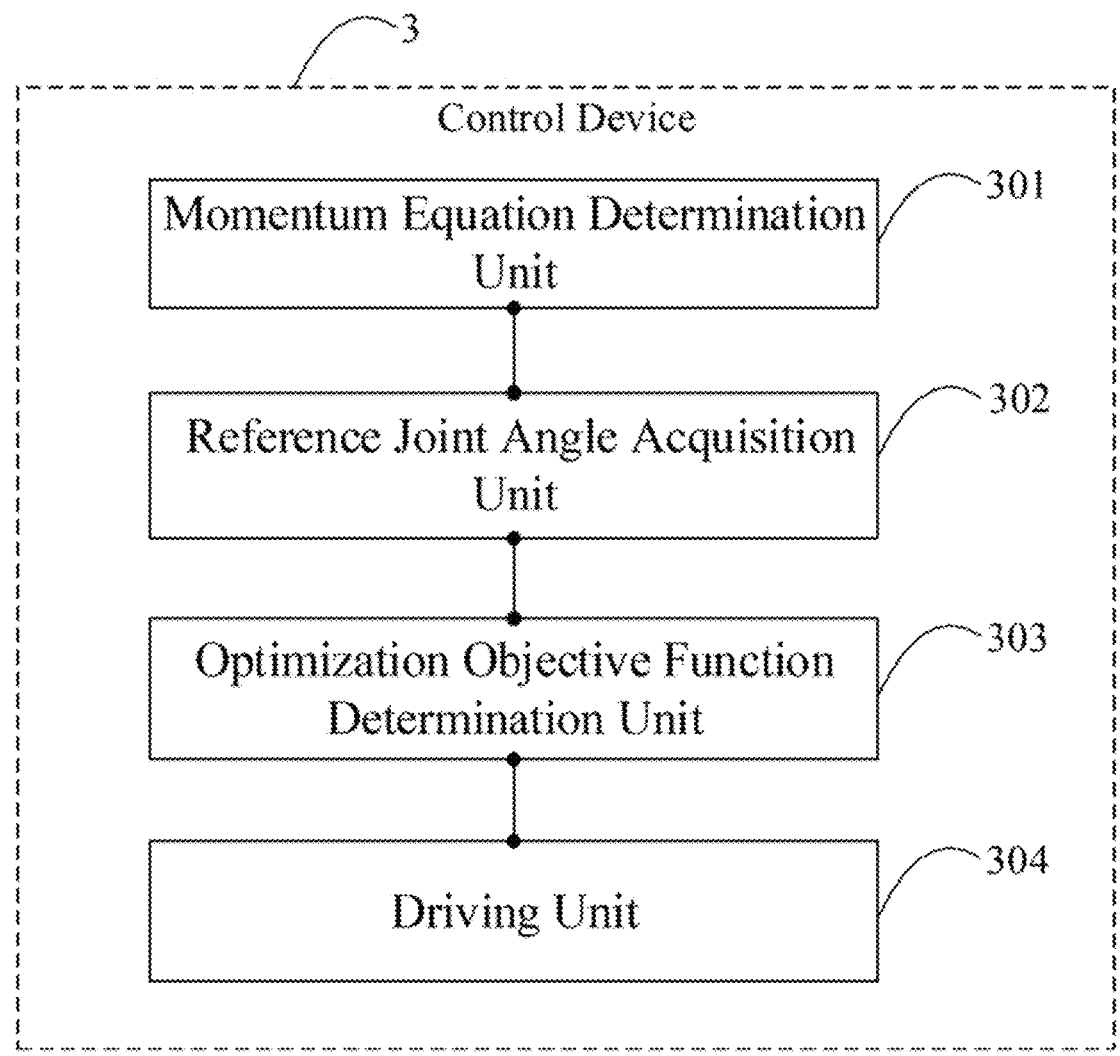
FIG. 4 is a schematic block diagram of a control device for a robot according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 10. For example, the one or more computer programs 103 may be divided into a momentum equation determination unit 301, a reference joint angle acquisition unit 302, an optimization objective function determination unit 303, and a driving unit 304 as shown in FIG. 4.

In one embodiment, the robot 10 is a biped robot and includes two arms 104 and two legs 105. Each of the arms 104 and legs 105 may include multiple motors/servos that enable the robot 10 to mimic the movements of human arms and human legs. It should be noted that the block diagram shown in FIG. 2 is only an example of the robot 10. The robot 10 may include more or fewer components than what is shown in FIG. 2, or have a different configuration than what is shown in FIG. 2. Each component shown in FIG. 2 may be implemented in hardware, software, or a combination thereof.

FIG. 3 shows an exemplary flowchart of a method for controlling the biped robot 10 according to one embodiment. The method may include steps S201 to S204.

Step S201: Obtain an inertia matrix and a slack variable of the robot, and determine a momentum equation of the robot according to the inertia matrix and the slack variable.

In one embodiment, the inertia matrix of the robot can be determined according to the degrees of freedom of the robot and the vector dimensions of each degree of freedom. For example, the robot shown in FIG. 1 may include 26 degrees of freedom, each of which can be represented by a six-dimensional vector. The six-dimensional vector includes rotational movement around the x, y, and z axes of a coordinate system and translational movement along those axes. Therefore, the matrix inertia of the robot shown in FIG. 1 can be expressed as a 26×6 matrix.

The introduction of the slack variable of the robot enables the robot to solve a task in a larger feasible region. When the slack variable is larger, the feasible range of the robot is larger. According to the design characteristics of the robot, the variation range of the slack variable of the robot can be determined. However, with the increase of the slack variable of the robot, while the robot's activity space increases, the instability factors of the robot will also increase. Therefore, the smaller the slack variable, the higher the stability and reliability of the robot when performing tasks.

In on embodiment, the momentum equation of the robot determined according to the inertia matrix and the slack variable can be expressed as follows: $h=\omega+A\dot{\theta}$, where h represents a preset momentum of the robot, which can be a 6-dimensional vector; $\omega$ represents a slack variable of joints of the robot, which can be a 6-dimensional vector; A represents the inertia matrix of the robot, and $\dot{\theta}$ represents angular velocities of the joints of the robot. In the embodiment as shown in FIG. 1, the inertia matrix can be a 26×6 matrix vector. An angular velocity is the change in angle of a joint of the robot in unit time. It can be determined according to the joint angles at two adjacent calculation moments. For example, assume that the joint angle at moment t−1 is θ1, the joint angle at moment t is θ2, and the time interval between moment t and moment t−1 is T, the angular velocity of the joint at moment t is (θ2−θ1)/T.

In one embodiment, the momentum of the robot can be determined based on an action performed by the robot. For example, the momentum of the robot when it runs can be set according to the running speed. Or, when the robot is bending over, the momentum for the robot to perform this action can be set. The corresponding relationship between the robot's action or state and the momentum of the robot can be preset. When the robot needs to perform a task, the corresponding momentum of each action is determined according to the action planning in the task, and the momentum equation is determined according to the determined momentum. The determined momentum equation controls the robot to perform a corresponding task, so that the robot can effectively ensure the reliability and stability of the task, and reduce the probability of the robot to fall and other abnormal problems.

The corresponding relationship between the robot's momentum and its action or state can be determined in advance through statistics, experiments, etc. The action of the robot can be determined by the change of the pose of each joint of the robot. According to the amount in change of the pose of each joint of the robot, as well as the change speed, change order and other factors of the pose of each joint, the different actions to be performed by the robot can be determined.

Step S202: Obtain reference joint angles corresponding to a reference action of the robot.

When the robot performs a task, a reference action of the robot can be set. For example, when a robot performs a bending task or action, a reference action corresponding to the action can be set. Based on the reference action, the reference trajectories of the movement of the robot's hands, feet and other components can be determined. According to the poses of the reference trajectory at different moments, the reference joint angles of the robot's joints at different moments can be determined.

For example, when the robot shown in FIG. 1 performs the bending action, the reference trajectory of each component of the robot when the bending action is performed may be determined according to the preset reference action. According to the reference trajectory of the robot when the action is performed, the reference joint angle of each joint of the robot can be determined. According to the reference joint angles at each moment in the bending process, they can be used for the robot to perform the corresponding action task with reference to the angles.

Step S203: Determine an optimization objective function of the momentum equation according to a first preset weight coefficient of the slack variable and a second preset weight coefficient of the reference joint angles.

After the momentum equation of the robot is determined, the optimization objective function of the momentum equation can be further determined, so as to determine the optimal angle corresponding to each joint when the robot performs a desired task.

The optimization objective function may include optimization for the slack variable, and optimization for reference actions. The first weight coefficient can be set to describe the optimization range of the slack variable, and the second weight coefficient can be set to describe the optimization range for the reference action. For example, the optimization objective function can be expressed as follows:

$$\min_{\theta,\omega} \lambda_1\|\omega\| + \lambda_2\|\theta_r - \theta\|,$$

where $\theta$ represents output joint angles of the robot, $\theta_{min} \leq \theta \leq \theta_{max}$, $\theta_{min}$ represents a minimum joint angle of the robot, $\theta_{max}$ represents a maximum joint angle of the robot, ω represents the slack variable of the robot, $\theta_r$ represents the reference joint angles, $\lambda_1$ represents the first weight coefficient, $\lambda_2$ represents the second weight coefficient, and both $\lambda_1$ and $\lambda_2$ are greater than 0, and a sum of $\lambda_1$ and $\lambda_2$ is a fixed value (e.g., $\lambda_1+\lambda_2=1$).

Through the optimization objective function, the slack variable is optimized to become smaller, and the differences between the joint angles and the reference joint angles are optimized to become smaller. As a result, the robot can perform the corresponding task according to the reference action set by the operator as much as possible, and it can reduce the defects of robot instability or reduced reliability caused by the excessive slack variable of the robot.

In the embodiment, the first weight coefficient and the second weight coefficient may correspond to the actions of the robot, or the first weight coefficient and the second weight coefficient may also correspond to the poses of the robot at different moments when the robot performs an action. When determining the corresponding relationship, the values of the first weight coefficient and the second weight coefficient corresponding to different poses of the robot when the robot performs different actions or actions performed by the robot can be determined through statistics, experiments and other methods.

Alternatively, during the process of the robot performing a task, the degree of stability of the robot when performing the task may be obtained. The values of the first weight coefficient and the second weight coefficient of the robot may be adjusted according to the obtained degree of stability, which enables the robot to perform tasks more stably and reliably. Moreover, after the robot obtains better stability or reliability by revising the first weight coefficient and the second weight coefficient, the adjustment data and the adjusted stability and reliability data can be stored. When the robot performs an action, the first weight coefficient and the second weight coefficient with the best performance can be obtained from the pre-stored data.

Step S204: Determine joint angles of the robot according to the optimization objective function, and driving the robot to move according to the joint angles of the robot.

The optimization objective function can be determined according to the determined first weight coefficient and second weight coefficient, combined with the preset reference joint angles. The solution of the momentum equation, including the slack variable in the momentum equation and the angular velocities of the joints of the robot, can be determined according to the optimization objective function.

Each joint angle of the robot in the optimization objective function can be determined in the following manner. Specifically, the angle difference between the current joint angle and the joint angle at the previous moment is first determined. Then, according to the angle difference, the amount of change in the joint angle per unit time, that is, the angular velocity of the joint of the robot, can be determined.

Alternatively, the joint angular velocity can also be combined with the joint angle at the previous moment to calculate the current joint angle of the robot.

After determining the slack variable of the momentum equation and the angular velocities of the joints of the robot according to the optimization objective function, the current joint angles of the robot can be determined according to the determined angular velocities of the joints of the robot and the joint angles of the robot at the previous moment.

For example, the current joint angles of the robot can be determined using the following equation: $\theta(k)=\theta(k-1)+\dot{\theta}(k)T$, where $\theta(k)$ represents the current joint angle, $\theta(k-1)$ represents the joint angle at the previous moment, $\dot{\theta}(k)$ represents the current angular velocity of a joint, and T is the length of time from the current moment to the previous moment.

According to the determined joint angles of the robot at the current moment, the joint motors can be driven to rotate the corresponding joints, so that the robot can perform the task according to the set reference action. In addition, the joint angles of the robot can satisfy the momentum equation, and the slack variable can be effectively reduced, which can improve the reliability of the robot to perform the task. By optimizing the first weight coefficient and the second weight coefficient in the objective function, the slack variable weight and reference action weight of the robot can be adjusted during the movement process, so that the robot has higher flexibility during the movement process. With the first weight coefficient and the second weight coefficient in the optimization objective function, the slack variable weight and reference action weight of the robot can be adjusted during the movement process, which enables the robot to be more flexible during the movement process.

It should be understood that sequence numbers of the foregoing processes do not mean an execution sequence in this embodiment of this disclosure. The execution sequence of the processes should be determined according to functions and internal logic of the processes, and should not be construed as any limitation on the implementation processes of this embodiment of this disclosure.

FIG. 4 is a schematic diagram of a control device 3 for a robot according to one embodiment. The control device may include a momentum equation determination unit 301, a reference joint angle acquisition unit 302, an optimization objective function determination unit 303, and a driving unit 304. The momentum equation determination unit 301 is to obtain an inertia matrix and a slack variable of the robot, and determine a momentum equation of the robot according to the inertia matrix and the slack variable. The reference joint angle acquisition unit 302 is to obtain reference joint angles corresponding to a reference action of the robot. The optimization objective function determination unit 303 is to determine an optimization objective function of the momentum equation according to a first preset weight coefficient of the slack variable and a second preset weight coefficient of the reference joint angles. The driving unit 304 is to determine joint angles of the robot according to the optimization objective function, and drive the robot to move according to the joint angles of the robot.

The control device of the robot shown in FIG. 4 corresponds to the control method of the robot shown in FIG. 2.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of this application. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method of controlling a robot, comprising:
    obtaining an inertia matrix and a slack variable of the robot, and determining a momentum equation of the robot according to the inertia matrix and the slack variable;
    obtaining reference joint angles corresponding to a reference action of the robot;
    determining an optimization objective function of the momentum equation according to a first preset weight coefficient of the slack variable and a second preset weight coefficient of the reference joint angles; and
    determining joint angles of the robot according to the optimization objective function, and driving the robot to move according to the joint angles of the robot.

2. The method of claim 1, wherein the momentum equation of the robot is as follows: $h=\omega+A\dot{\theta}$, where h represents a preset momentum of the robot, $\omega$ represents a slack variable of joints of the robot, A represents the inertia matrix of the robot, and $\dot{\theta}$ represents angular velocities of the joints of the robot.

3. The method of claim 2, wherein determining the momentum equation of the robot according to the inertia matrix and the slack variable comprises:
    determining the momentum of the robot based on an action performed by the robot.

4. The method of claim 1, wherein the optimization objective function of the momentum equation is as follows:

$$\min_{\theta,\omega} \lambda_1 \|\omega\| + \lambda_2 \|\theta_r - \theta\|,$$

where $\theta$ represents output joint angles of the robot, $\theta_{min} \leq \theta \leq \theta_{max}$, $\theta_{min}$ represents a minimum joint angle of the robot, $\theta_{max}$ represents a maximum joint angle of the robot, $\omega$ represents the slack variable of the robot, $\theta_r$ represents the reference joint angles, $\lambda_1$ represents the first weight coefficient, $\lambda_2$ represents the second weight coefficient, and both $\lambda_1$ and $\lambda_2$ are greater than 0, and a sum of $\lambda_1$ and $\lambda_2$ is a fixed value.

5. The method of claim 1, wherein determining joint angles of the robot according to the optimization objective function comprises:
    determining angular velocities of joints of the robot according to the optimization objective function; and
    determining joint angles of the robot according to the angular velocities of the joints of the robot.

6. The method of claim 5, wherein the angular velocities of joints of the robot are determined according to the following equation: $\theta(k)=\theta(k-1)+\dot{\theta}(k)T$, where $\theta(k)$ represents a current joint angle, $\theta(k-1)$ represents a joint angle at a previous moment, $\dot{\theta}(k)$ represents a current joint angular velocity, and T represents a length of time from a current moment to the previous moment.

7. The method of claim 1, wherein the first weight coefficient and the second weight coefficient are determined according to stability data of the robot.

8. A robot comprising:
    one or more processors; and
    a memory coupled to the one or more processors, the memory storing programs that, when executed, cause the one or more processors to:
    obtain an inertia matrix and a slack variable of the robot, and determine a momentum equation of the robot according to the inertia matrix and the slack variable;
    obtain reference joint angles corresponding to a reference action of the robot;
    determine an optimization objective function of the momentum equation according to a first preset weight coefficient of the slack variable and a second preset weight coefficient of the reference joint angles; and
    determine joint angles of the robot according to the optimization objective function, and drive the robot to move according to the joint angles of the robot.

9. The robot of claim 8, wherein the momentum equation of the robot is as follows: $h=\omega+A\dot{\theta}$, where h represents a preset momentum of the robot, $\omega$ represents a slack variable of joints of the robot, A represents the inertia matrix of the robot, and $\dot{\theta}$ represents angular velocities of the joints of the robot.

10. The robot of claim 9, wherein to determine the momentum equation of the robot according to the inertia matrix and the slack variable, the programs, when executed, cause the one or more processors to: determine the momentum of the robot based on an action performed by the robot.

11. The robot of claim 8, wherein the optimization objective function of the momentum equation is as follows:

$$\min_{\theta,\omega} \lambda_1 \|\omega\| + \lambda_2 \|\theta_r - \theta\|,$$

where $\theta$ represents output joint angles of the robot, $\theta_{min} \leq \theta \leq \theta_{max}$, $\theta_{min}$ represents a minimum joint angle of the robot, $\theta_{max}$ represents a maximum joint angle of the robot, $\omega$ represents the slack variable of the robot, $\theta_r$ represents the reference joint angles, $\lambda_1$ represents the first weight coefficient, $\lambda_2$ represents the second weight coefficient, and both $\lambda_1$ and $\lambda_2$ are greater than 0, and a sum of $\lambda_1$ and $\lambda_2$ is a fixed value.

12. The robot of claim 8, wherein to determine joint angles of the robot according to the optimization objective function, the programs, when executed, cause the one or more processors to:
  determine angular velocities of joints of the robot according to the optimization objective function; and
  determine joint angles of the robot according to the angular velocities of the joints of the robot.

13. The robot of claim 12, wherein the angular velocities of joints of the robot are determined according to the following equation: $\theta(k)=\theta(k-1)+\dot{\theta}(k)T$, where $\theta(k)$ represents a current joint angle, $\theta(k-1)$ represents a joint angle at a previous moment, $\dot{\theta}(k)$ represents a current joint angular velocity, and T represents a length of time from a current moment to the previous moment.

14. The robot of claim 8, wherein the first weight coefficient and the second weight coefficient are determined according to stability data of the robot.

15. A non-transitory computer-readable storage medium storing instructions that, when executed by at least one processor, cause the at least one processor to perform a control method for a robot, the method comprising:
  obtaining an inertia matrix and a slack variable of the robot, and determining a momentum equation of the robot according to the inertia matrix and the slack variable;
  obtaining reference joint angles corresponding to a reference action of the robot;
  determining an optimization objective function of the momentum equation according to a first preset weight coefficient of the slack variable and a second preset weight coefficient of the reference joint angles; and
  determining joint angles of the robot according to the optimization objective function, and driving the robot to move according to the joint angles of the robot.

16. The non-transitory computer-readable storage medium of claim 15, wherein the momentum equation of the robot is as follows: $h=\omega+A\dot{\theta}$, where h represents a preset momentum of the robot, $\omega$ represents a slack variable of joints of the robot, A represents the inertia matrix of the robot, and $\dot{\theta}$ represents angular velocities of the joints of the robot.

17. The non-transitory computer-readable storage medium of claim 16, wherein determining the momentum equation of the robot according to the inertia matrix and the slack variable comprises:
  determining the momentum of the robot based on an action performed by the robot.

18. The non-transitory computer-readable storage medium of claim 15, wherein the optimization objective function of the momentum equation is as follows:

$$\min_{\theta,\omega} \lambda_1 \|\omega\| + \lambda_2 \|\theta_r - \theta\|,$$

where $\theta$ represents output joint angles of the robot, $\theta_{min} \leq \theta \leq \theta_{max}$, $\theta_{min}$ represents a minimum joint angle of the robot, $\theta_{max}$ represents a maximum joint angle of the robot, $\omega$ represents the slack variable of the robot, $\theta_r$ represents the reference joint angles, $\lambda_1$ represents the first weight coefficient, $\lambda_2$ represents the second weight coefficient, and both $\lambda_1$ and $\lambda_2$ are greater than 0, and a sum of $\lambda_1$ and $\lambda_2$ is a fixed value.

19. The non-transitory computer-readable storage medium of claim 15, wherein determining joint angles of the robot according to the optimization objective function comprises:
  determining angular velocities of joints of the robot according to the optimization objective function; and
  determining joint angles of the robot according to the angular velocities of the joints of the robot.

20. The non-transitory computer-readable storage medium of claim 19, wherein the angular velocities of joints of the robot are determined according to the following equation: $\theta(k)=\theta(k-1)+\dot{\theta}(k)T$, where $\theta(k)$ represents a current joint angle, $(k-1)$ represents a joint angle at a previous moment, $\dot{\theta}(k)$ represents a current joint angular velocity, and T represents a length of time from a current moment to the previous moment.

* * * * *